United States Patent [19]
Date et al.

[11] 3,878,826
[45] Apr. 22, 1975

[54] INTERNAL COMBUSTION ENGINE WITH PRECHAMBER

[75] Inventors: Tasuku Date, Tokyo; Yasuhito Sato, Kamifukuoka, both of Japan

[73] Assignee: Honda Giken Kogyo Kabushiki Kaisha, Tokyo, Japan

[22] Filed: July 16, 1973

[21] Appl. No.: 379,841

[52] U.S. Cl. ...... 123/32 ST; 123/32 SP; 123/5 LM; 123/75 B; 123/191 S
[51] Int. Cl. ........................................ F02b 19/00
[58] Field of Search ........... 123/32 R, 32 ST, 32 SP, 123/32 SA, 52 M

[56] References Cited
UNITED STATES PATENTS
| | | | |
|---|---|---|---|
| 2,065,419 | 12/1936 | Bagnulo | 123/32 SP |
| 3,439,658 | 4/1969 | Simonet | 123/75 R |
| 3,633,553 | 1/1972 | Holzapfel | 123/32 ST |

*Primary Examiner*—Charles J. Myhre
*Assistant Examiner*—William C. Anderson
*Attorney, Agent, or Firm*—Lyon & Lyon

[57] ABSTRACT

A four-cycle internal combustion engine has eight cylinders each provided with a main combustion chamber and an auxiliary combustion chamber connected by a torch nozzle. A carburetor has a venturi throat supplying rich mixture to each of the auxiliary chambers and other carburetor throats supplying a lean mixture to each of the main chambers. Although the effective cross sectional area of the venturi throat for the rich mixture need not be larger than the effective cross sectional area of a single torch nozzle when the engine has four cylinders or six cylinders, an eight cylinder engine requires that the venturi throat for the rich mixture be smaller than 1.4 times as large in effective cross sectional area as each of the torch nozzles.

4 Claims, 7 Drawing Figures

FOUR-CYLINDER ENGINE

SIX-CYLINDER ENGINE

EIGHT-CYLINDER ENGINE

INTERNAL COMBUSTION ENGINE WITH PRECHAMBER

This invention relates to four-cycle internal combustion piston engines and is particularly directed to multicylinder engines of this type in which each cylinder has a main combustion chamber and an auxiliary combustion chamber, the chambers being connected by a torch nozzle. The auxiliary combustion chamber is also known as a pre-chamber. A carburetor assembly has one or more main venturi throats which supply lean mixture to each of the main combustion chambers. Also, the carburetor assembly has an auxiliary venturi throat for supplying the rich mixture to each of the auxiliary combustion chambers (or pre-chambers). When the engine has only four cylinders or less, the pistons each complete their suction stroke in turn, without any overlap in suction strokes. Accordingly, the rich mixture is sucked into each auxiliary combustion chamber in sequence, and without overlap. The size of the auxiliary venturi throat need only be large enough to supply each torch nozzle separately. This requirement is disclosed in the copending application of Date et al Ser. No. 353,786, filed Apr. 23, 1973.

In the case of a six cylinder engine of this type having main chambers and auxiliary chambers connected by torch nozzles, the suction strokes of the pistons overlap in time so that rich mixture must be supplied to more than one torch nozzle at any given instant. However, the type and extent of the overlap is insufficient to cause a flow of rich mixture at any greater maximum rate than the peak rate for each individual system. Accordingly, the venturi throat for the rich mixture need not be substantially larger than any single torch nozzle, for a six cylinder engine.

In an eight cylinder engine of this type having main chambers and auxiliary chambers connected by torch nozzles, the suction strokes of the pistons overlap to such an extent that the rich mixture must be supplied in greater quantity and to more than one torch nozzle at any given instant.

From a practical standpoint it is not satisfactory to build an oversize carburetor assembly having excess capacity to supply both lean mixtures and rich mixtures. Not only is it unsuitable from an economic standpoint to provide an oversize carburetor assembly, it is even more important to maintain the proper air-fuel ratio in the main chambers and auxiliary chambers for all operating conditions of the engine, in order to achieve efficient operation and to avoid production of unwanted pollutants in the exhaust gases of the engine, and merely increasing the size of a venturi throat creates many related design problems.

Accordingly, it is the principal object of this invention to provide a carburetor assembly for an eight cylinder four-cycle spark ignition internal combustion engine of the pre-chamber type.

Other and more detailed objects and advantages will appear hereinafter.

Figure 1:
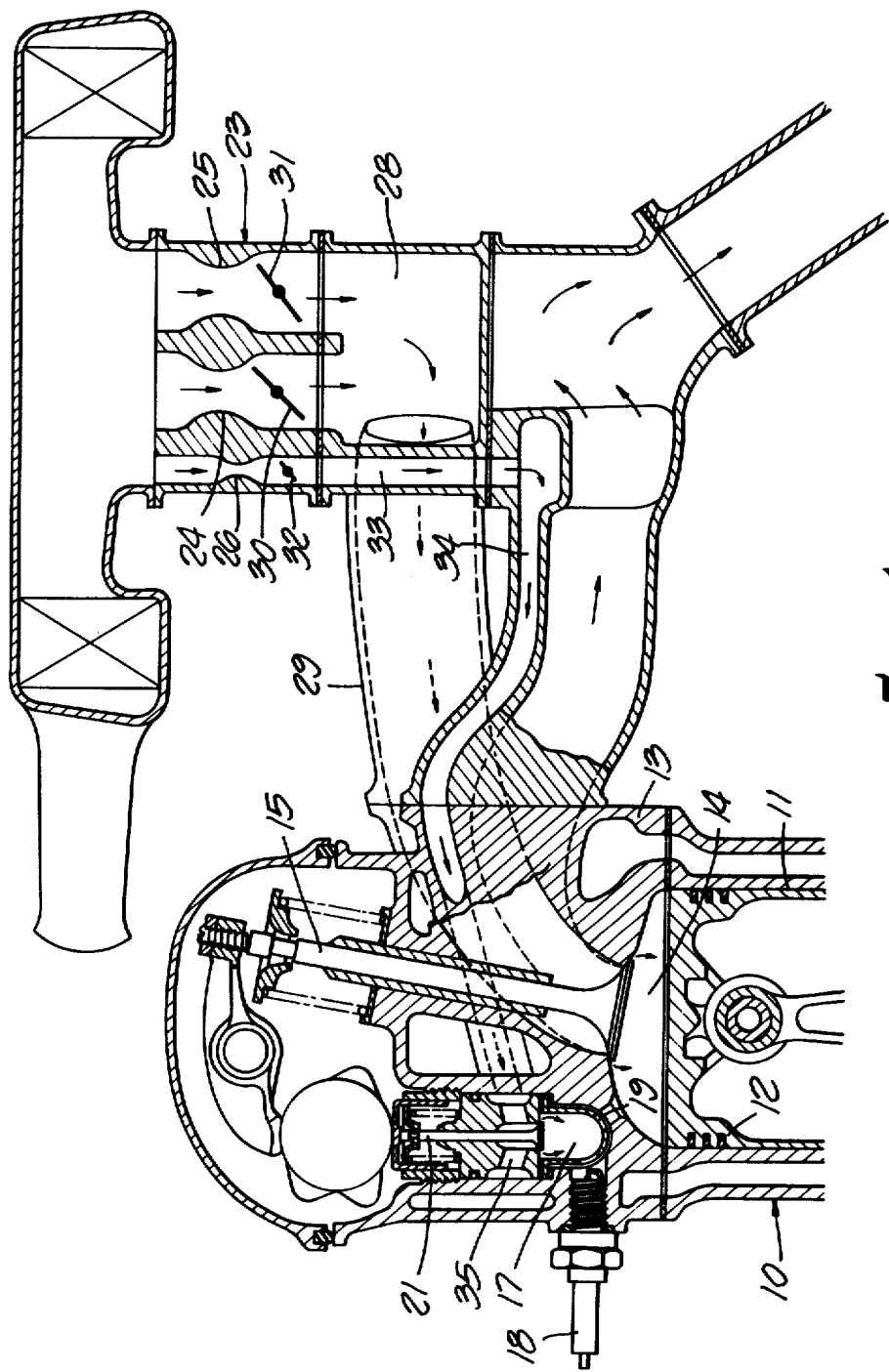
FIG. 1 is a sectional elevation in diagrammatic form showing a preferred embodiment of this invention.

Referring to the drawings, and particularly to FIG. 1 thereof, the four-cycle internal combustion piston engine generally designated 10 includes a plurality of cylinders 11 each having a piston 12 reciprocable therein. The cylinder head 13 cooperates with the pistons 12 to define a plurality of main combustion chambers 14, each having an inlet valve 15 and an exhaust valve 16.

Associated with each main combustion chamber 14 is an auxiliary combustion chamber 17 formed in the cylinder head 13 and provided with a spark plug 18. Each auxiliary chamber 17 communicates with its respective main chamber 14 by way of a torch nozzle 19. A rich mixture delivered to the auxiliary chamber 17 through the auxiliary intake valve 21 is ignited, after compression, to cause a flame to project through the torch nozzle 19 to burn a lean mixture in the main combustion chamber 14.

It is important to maintain the proper air-fuel ratio in both chambers 17 and 14 for all operating conditions of the engine. In order to achieve this purpose a multiple throat carburetor assembly generally designated 23 is provided. This assembly 23 includes a primary venturi throat 24, a secondary venturi throat 25, and an auxiliary venturi throat 26. The venturi throats 24 and 25 are used to supply a lean mixture to the main combustion chambers 14 through passage 28 and through inlet manifold 29 leading to intake valves 15. Means, not shown, are provided for connecting the throttle valves 30 and 31 for coordinated movement.

The rich mixture for the auxiliary chambers 17 is controlled by means of the auxiliary venturi 26 and the auxiliary throttle valve 32, connected through passages 33, 34 and 35 leading to the auxiliary intake valves 21. Suitable mechanism is provided for operating the valves 15, 16 and 21 in timed sequence. In general, the intake valves 15 and 21 for any one cylinder open and close at substantially the same times.

Figure 2:
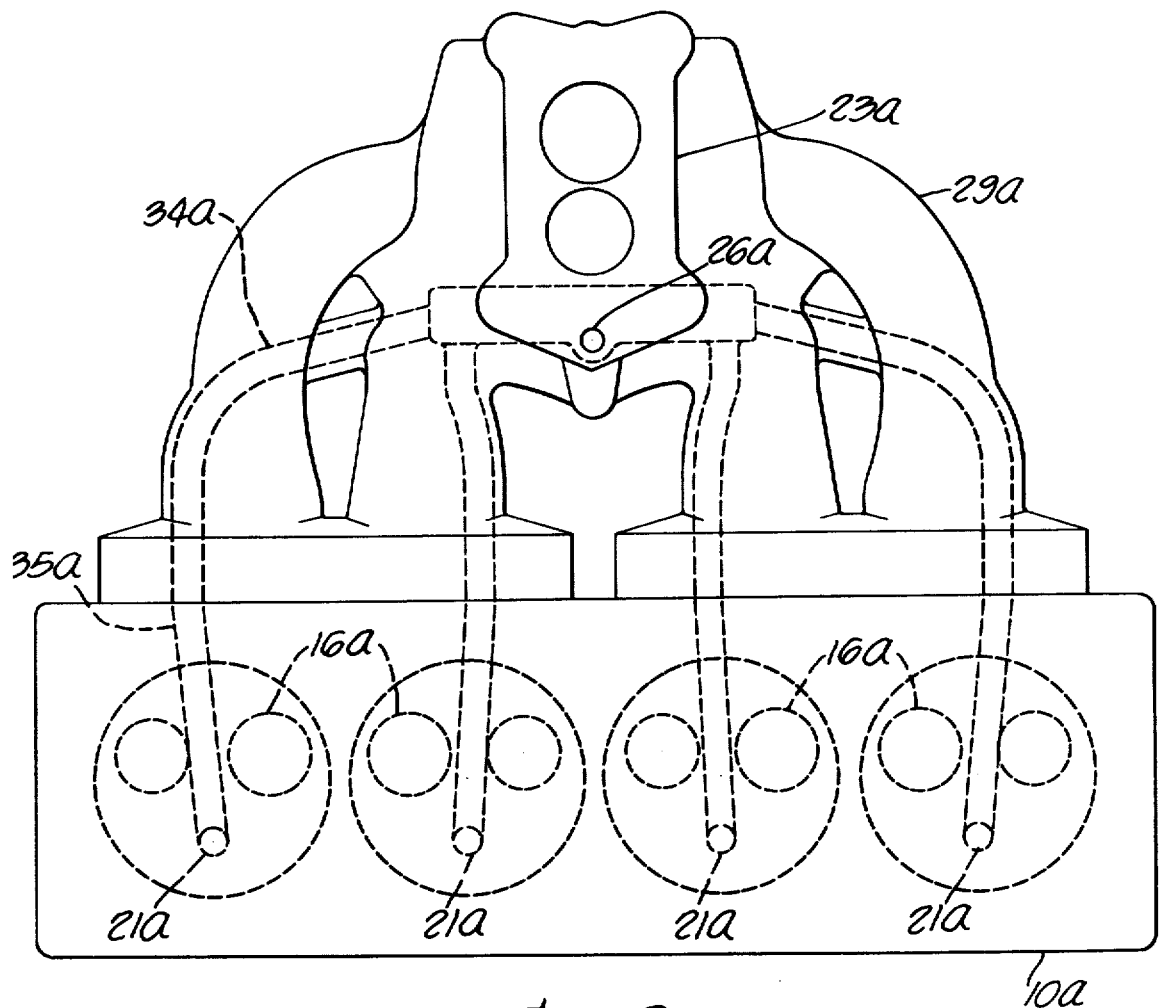
FIG. 2 is a plan view in diagrammatic form showing a four cylinder four-cycle internal combustion engine of the type described.

The four-cylinder engine 10a shown diagrammatically in FIG. 2 employs a carburetor assembly 23a which supplies a lean mixture through the intake manifold 29a to each of the main combustion chambers through the intake valves 16a. The auxiliary venturi throat 26a of the carburetor assembly 23a supplies rich mixture through passages 34a and 35a to auxiliary intake valves 21a.

Figure 3:
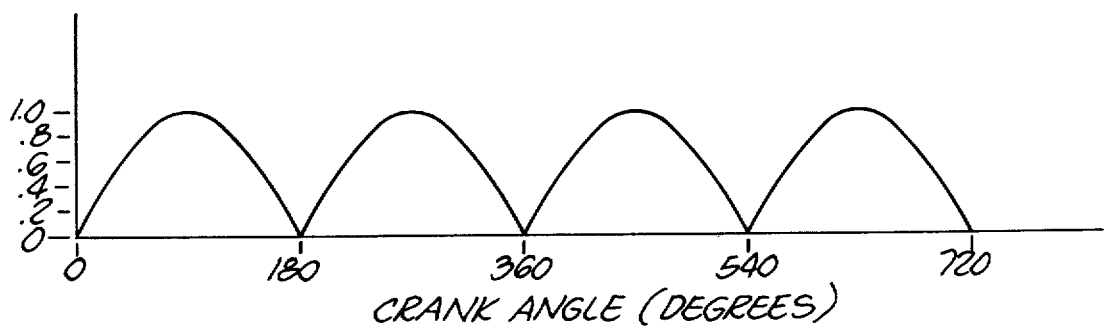
FIG. 3 is a diagram showing suction strokes of each of the four pistons plotted against crank angle.

The diagram of FIG. 3 shows that the suction strokes of the four pistons do not overlap, and therefore the maximum rate of flow through the auxiliary venturi throat 26a is no greater than the maximum flow through any one of the auxiliary intake valves 21a. Stated in other words, the intake of rich mixture through each one of the torch nozzles occurs sequentially, and none overlaps another. The rich mixture is drawn through each torch nozzle in turn. Accordingly, the effective size of the venturi throat 26a need be no larger than that of any one torch nozzle.

Figure 4:
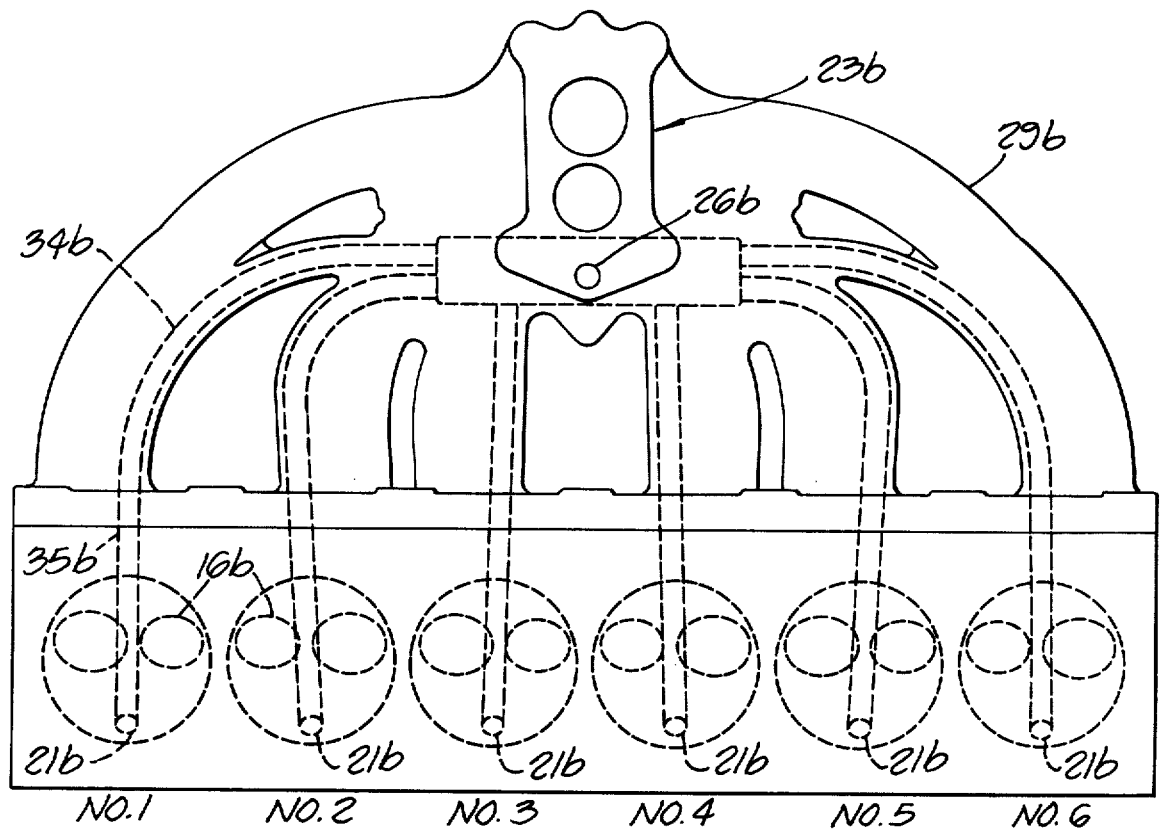
FIG. 4 is a plan view in diagrammatic form showing a six cylinder four-cycle internal combustion engine of the type described.
Figure 5:
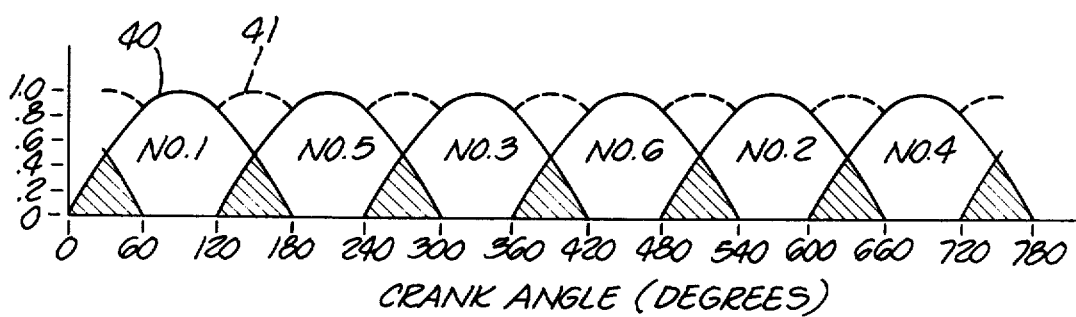
FIG. 5 is a diagram showing the suction strokes of the six pistons plotted against crank angle, and showing overlap of such suction strokes.

When the engine has six cylinders, as shown in FIG. 4, the auxiliary venturi throat 26b which feeds rich mixture through the passages 34b and 35b to the six auxiliary intake valves 21b, must be large enough to supply more than one torch nozzle at any given instant. This is true because there is a certain amount of overlap in the suction strokes of the six pistons. Thus, as shown in FIG. 5, the suction stroke of the No. 5 piston begins before the suction of the No. 1 piston has been completed. The theoretical overlap as shown in FIG. 5 is 60 degrees of crank angle. However, the maximum demand for the rich air-fuel mixture in each auxiliary torch nozzle is not substantially higher than the peak of the section stroke of any one piston. Thus, adding ordinates of adjacent suction curves 40 produces the dotted line curve 41, but the peak of this curve 41 is found to be no higher than the numerical value of the peak at the top of the suction curve 40 for each piston assuming a sine wave curve for each suction stroke. While it is true that practical considerations such as angularity of the connecting rods change the suction curves from true sine waves, and while the variations in flow of rich mixture occur by reason of fluid friction in the conduits and by reason of valve timing requirements, nevertheless these constitute only minor variations from the theoretical curves shown in FIG. 5.

It is apparent, therefore, from a consideration of the six cylinder engine curves shown in FIG. 5, that the auxiliary venturi throat 26b need not be substantially larger in cross sectional area than the cross sectional area of any one torch nozzle.

Figure 6:
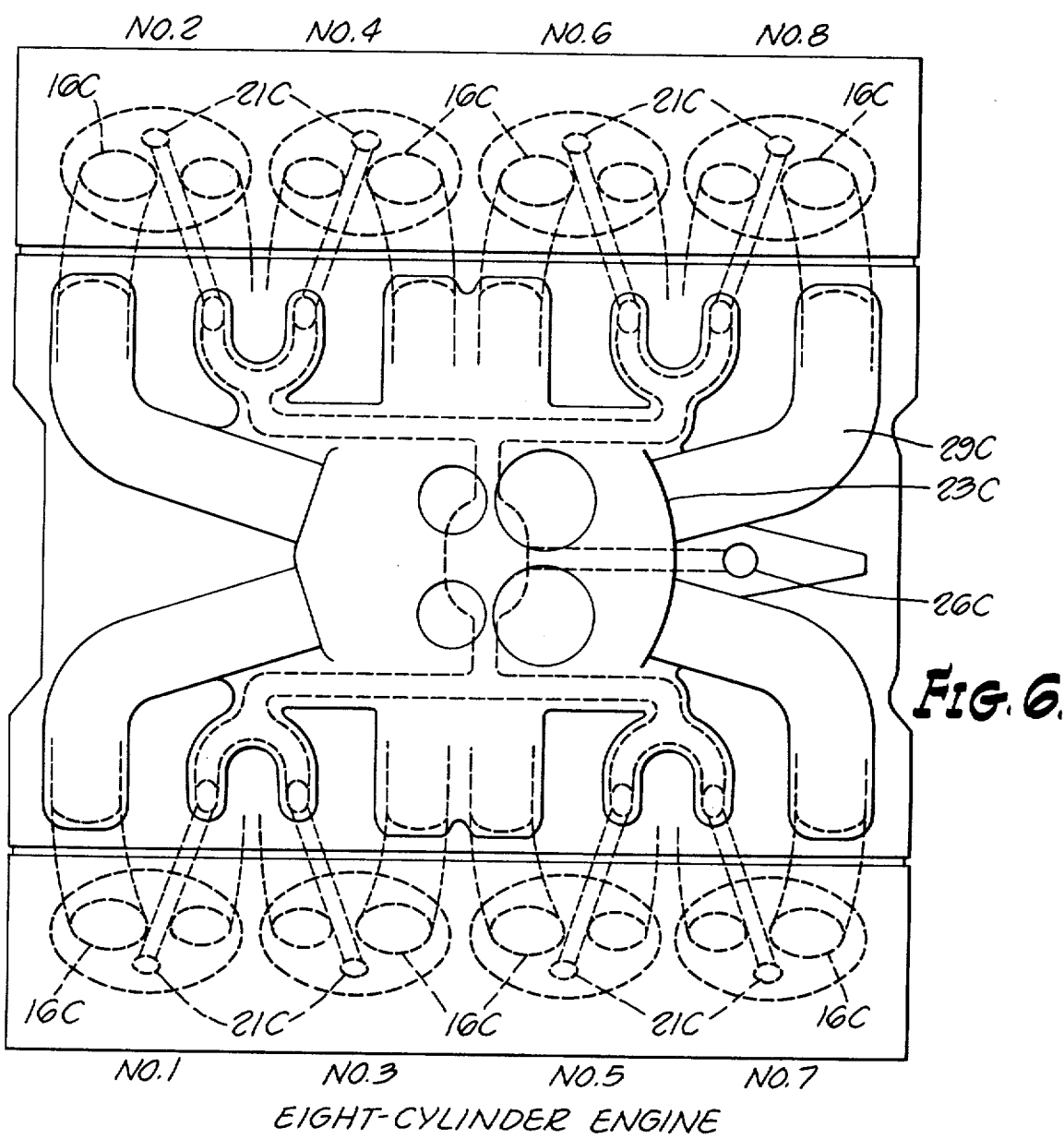
FIG. 6 is a plan view in diagrammatic form showing the application of this invention to an eight cylinder four-cycle internal combustion piston engine.

Referring to the eight cylinder engine shown in FIG. 6, two banks of four cylinders each are employed and the intake manifold 29c distributes lean mixture to each of the intake valves 16c from the carburetor generally designated 23c. The auxiliary venturi throat 26c passes all of the air needed for the rich mixture distributed to each of the eight auxiliary intake valves 21c.

Figure 7:
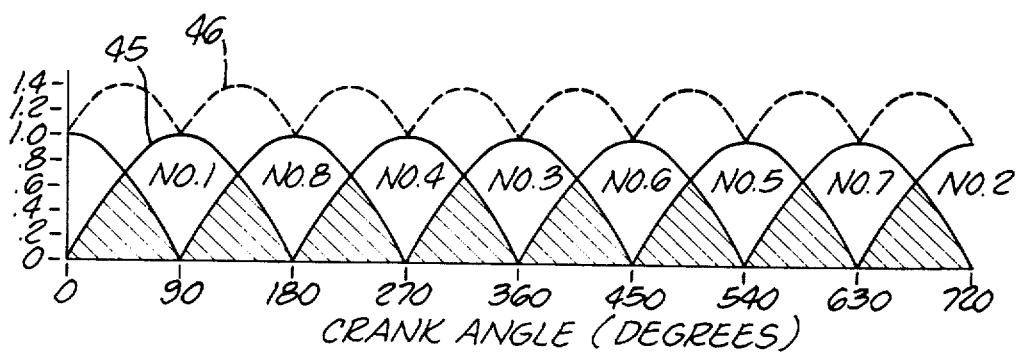
FIG. 7 is a diagram showing the suction strokes of the eight pistons plotted against crank angle, and showing overlap between such suction strokes.

Since there are eight pistons each going through a complete four-cycle sequence in 720° of crank angle, each piston during its suction stroke overlaps one-half of the suction stroke of another piston. Thus as shown in the diagram of FIG. 7, the No. 8 piston begins its suction stroke while the No. 1 piston has completed only one-half of its total suction stroke. Thus, at any given instant the total demand for rich mixture is the sum of any adjacent two suction curves 45. The cotted curve 46 is the result of adding the ordinates of the two curves 45 together at each angular position of the crank. Accordingly, it is found that for an eight-cylinder engine the cross sectional area of the auxiliary venturi throat 26c must be 1.4 times the cross sectional area of each torch nozzle. While practical considerations such as angularity of the piston rods, fluid friction, and valve timing have minor effects on this theoretical set of curves, as pointed out in connection with FIG. 5, nevertheless the curves are substantially correct and are supported by experimental data.

Summarizing, $F_t > F_v/K_{(n)}$ where $F_t$ = cross sectional area of one torch nozzle $K_{(n)}$ = suction overlap coefficient = 1.0 for four or less cylinder engines = 1.0 for six cylinder engines = 1.4 for eight cylinder engines $F_v$ = effective cross sectional area of the venturi passage means Having fully described our invention, it is to be understood that we are not to be limited to the details herein set forth but that our invention is of the full scope of the appended claims.

We claim:

1. In a multi-cylinder four-cycle internal combustion piston engine having a plurality of duplicate main combustion chambers each having one wall thereof formed by a piston, a plurality of duplicate auxiliary combustion chambers, and a plurality of duplicate torch nozzles each connecting an auxiliary combustion chamber to a main combustion chamber, respectively, the improvement comprising, in combination: means including passage means for delivering a lean mixture to all of the main combustion chambers, means including a passage for delivering a rich mixture to all of the auxiliary combustion chambers, all of the auxiliary combustion chambers receiving rich mixture from the same venturi passage, each torch nozzle having an effective cross sectional area relating to the cross sectional area of the venturi passage according to the following formula:

$F_t > F_v/K_{(n)}$ where $F_t$ = cross sectional area of one torch nozzle $K_{(n)}$ = suction overlap coefficient = 1.0 for four or less cylinder engines = 1.0 for six cylinder engines = 1.4 for eight cylinder engines $F_v$ = effective cross sectional area of the venturi passage.

2. The combination set forth in claim 1 in which the venturi passage comprises a single venturi throat in a carburetor.

3. In an eight cylinder internal combustion piston engine having eight main combustion chambers each having one wall thereof formed by a piston, eight auxiliary combustion chambers, and eight duplicate torch nozzles each connecting an auxiliary combustion chamber to a main combustion chamber, respectively, the improvement comprising, in combination: means including passage means for delivering a lean mixture to all of the main combustion chambers, means including a venturi passage for delivering a rich mixture to all of the auxiliary combustion chambers, the effective cross sectional area of the venturi passage being smaller than 1.4 times the effective cross sectional area of one torch nozzle.

4. The combination set forth in claim 3 in which the venturi passage comprises a single venturi throat in a carburetor.

* * * * *